United States Patent
Zhang et al.

(10) Patent No.: US 8,805,204 B2
(45) Date of Patent: Aug. 12, 2014

(54) GENERATING HIGHER-LEVEL QUADRATURE AMPLITUDE MODULATION (QAM) USING A DELAY LINE INTERFEROMETER AND SYSTEMS AND METHODS INCORPORATING SAME

(75) Inventors: Hongbin Zhang, Marlboro, NJ (US); Jin-Xing Cai, Morganville, NJ (US); Yu Sun, Lansdale, PA (US); Carl R. Davidson, Warren, NJ (US); Yi Cai, Jackson, NJ (US); Georg Heinrich Mohs, East Brunswick, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 389 days.

(21) Appl. No.: 13/032,982

(22) Filed: Feb. 23, 2011

(65) Prior Publication Data

US 2012/0213522 A1    Aug. 23, 2012

(51) Int. Cl.
*H04B 10/04* (2006.01)
*H04B 10/12* (2006.01)

(52) U.S. Cl.
USPC ............................................................ 398/183

(58) Field of Classification Search
USPC ............................................... 398/182–201
See application file for complete search history.

(56) References Cited

U.S. PATENT DOCUMENTS

| | | | |
|---|---|---|---|
| 6,407,843 B1 | 6/2002 | Rowan et al. | |
| 6,728,434 B2 | 4/2004 | Flanders | |
| 6,956,989 B2 | 10/2005 | Van Tuyl | |
| 7,092,642 B2 | 8/2006 | Way | |
| 7,505,695 B2 | 3/2009 | Sugihara et al. | |
| 7,558,487 B2 | 7/2009 | Liu et al. | |
| 7,873,284 B2 | 1/2011 | Chen et al. | |
| 2008/0025733 A1 | 1/2008 | Nazarathy et al. | |
| 2009/0185810 A1* | 7/2009 | Kaplan et al. | 398/184 |
| 2009/0269080 A1* | 10/2009 | Akiyam et al. | 398/188 |
| 2009/0324253 A1* | 12/2009 | Winzer | 398/185 |
| 2010/0232796 A1 | 9/2010 | Cai | |
| 2010/0232797 A1 | 9/2010 | Cai et al. | |
| 2010/0232809 A1 | 9/2010 | Cai et al. | |
| 2011/0051215 A1* | 3/2011 | Zhou | 359/238 |

OTHER PUBLICATIONS

Kang et al, Generation of 173-Gbits/s single-polarization QPSK signals by all-optical format conversion using a photonic integrated device, presented in 35th European Conference on Optical Communication, 2009.*

Kikuchi et al, Incoherent 32-Level Optical Multilevel Signaling Technologies (Published in Journal of Lightwave Technology, vol. 26, No. 1, Jan. 1, 2008).*

International Search Report and Written Opinion mailed May 2, 2012 in corresponding PCT Patent Application No. PCT/US12/026098.

* cited by examiner

*Primary Examiner* — David Payne
*Assistant Examiner* — Casey Kretzer (57) ABSTRACT

In general, optical communication systems and methods may generate higher-level $n^m$QAM from nQAM signals using one or more delay line interferometers (DLIs) arranged in various configurations. The nQAM signals may be generated by a lower-level modulator, such as a BPSK modulator, QPSK modulator or lower-level QAM modulator, with binary driving signals. Different parameters of the DLIs, such as free spectral range (FSR), phase shift, and amplitude imbalance, may be selected to accomplish the desired higher-level $n^m$QAM depending upon the nQAM signal.

6 Claims, 8 Drawing Sheets

GENERATING HIGHER-LEVEL QUADRATURE AMPLITUDE MODULATION (QAM) USING A DELAY LINE INTERFEROMETER AND SYSTEMS AND METHODS INCORPORATING SAME

CROSS-REFERENCE TO RELATED APPLICATIONS

The present application is related to U.S. patent application Ser. No. 13/033,084, which is filed concurrently herewith and fully incorporated herein by reference.

TECHNICAL FIELD

The present application relates to the optical transmission of information and more particularly, to generating higher-level $n^m$ quadrature amplitude modulation (QAM) from nQAM signals using one or more delay line interferometers (DLIs) and systems and methods incorporating the same.

BACKGROUND

Signals may be used to transmit data over distances. In optical communication systems, for example, data may be modulated on one or more optical wavelengths to produce modulated optical signals that may be transmitted over optical waveguides such as optical fibers. Optical communications systems have used techniques such as wavelength division multiplexing (WDM) and various multi-level modulation formats to increase the transmission capacity. In a multi-level modulation format, multiple data bits may be encoded on a single transmitted symbol. Multi-level modulation techniques have been used, for example, to allow increased transmission rates and decreased channel spacing, thereby increasing the spectral efficiency (SE) of each channel in a WDM system.

One type of modulation that may be used in optical communication systems is phase shift keying (PSK). According to different variations of PSK, data is transmitted by modulating the phase of an optical wavelength such that the phase or phase transition of the optical wavelength represents symbols encoding one or more bits. In a binary phase-shift keying (BPSK) modulation scheme, for example, two phases may be used to represent 1 bit per symbol. In a quadrature phase-shift keying (QPSK) modulation scheme, four phases may be used to encode 2 bits per symbol. Other phase shift keying formats include differential phase shift keying (DPSK) formats and variations of PSK and DPSK formats, such as return-to-zero DPSK (RZ-DPSK) and phase division multiplexed QPSK (PDM-QPSK).

Another spectrally efficient multi-level modulation format is quadrature amplitude modulation (QAM). According to QAM, information may be modulated using a combination of phase shift keying and amplitude shift keying, for example, to encode multiple bits per symbol. A 16-QAM modulation format may be used, for example, to encode 4 bits per symbol. Certain PSK modulation schemes (e.g., BPSK and QPSK) may be referred to as a level of QAM (e.g., 2QAM and 4QAM respectively). Although 1024QAM has been demonstrated, it is difficult to generate nQAM for n>4.

Several different schemes may be used to generate higher levels of QAM. In one scheme, tandem AM (for amplitude) and PM (for phase) modulators may be used with a multi-level RF driving signal. In another scheme, a single IQ modulator and multi-level RF driving signal may be used. In a further scheme, multiple parallel Mach-Zehnder (MZ) modulators, each driven by a binary RF signal, may be used in a nested MZ structure. In yet another scheme, tandem AM/PM/QPSK modulators may be used with binary driving signals for each modulator.

With multilevel RF driving signals, achieving uniform QAM signal constellations may be difficult due to the non-linear transfer functions of the MZ modulators. Therefore, a binary RF driving signal may be preferred. Although a binary RF driving signal may be used with tandem AM/PM/QPSK modulators, maintaining synchronization among all modulators in such a system may be difficult. The integration of multiple parallel MZ modulators may also be difficult to achieve.

BRIEF DESCRIPTION OF THE DRAWINGS

Reference should be made to the following detailed description which should be read in conjunction with the following figures, wherein like numerals represent like parts.

DETAILED DESCRIPTION

In general, optical communication systems and methods, consistent with the present disclosure, generate higher-level $n^m$QAM from nQAM signals using one or more delay line interferometers (DLIs) arranged in various configurations. The nQAM signals may be generated by a lower-level modulator, such as a BPSK modulator, QPSK modulator or lower-level QAM modulator, with binary driving signals. Different parameters of the DLIs, such as free spectral range (FSR), phase shift, and amplitude imbalance, may be selected to accomplish the desired higher-level $n^m$QAM depending upon the nQAM signal.

The terms nQAM and $n^m$QAM, as used herein, refer to quadrature amplitude modulation where n and $n^m$ are integer values representing the number of points in a constellation diagram representing the nQAM or $n^m$QAM signal. As used herein, 2QAM is equivalent to binary phase shift keying (BPSK) and 4QAM is equivalent to quadrature phase shift keying (QPSK). As used herein, a "delay line interferometer" or "DLI" refers to an interferometer including two or more interferometer arms with a time delay on at least one arm relative to the other arm(s). The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

Figure 1:
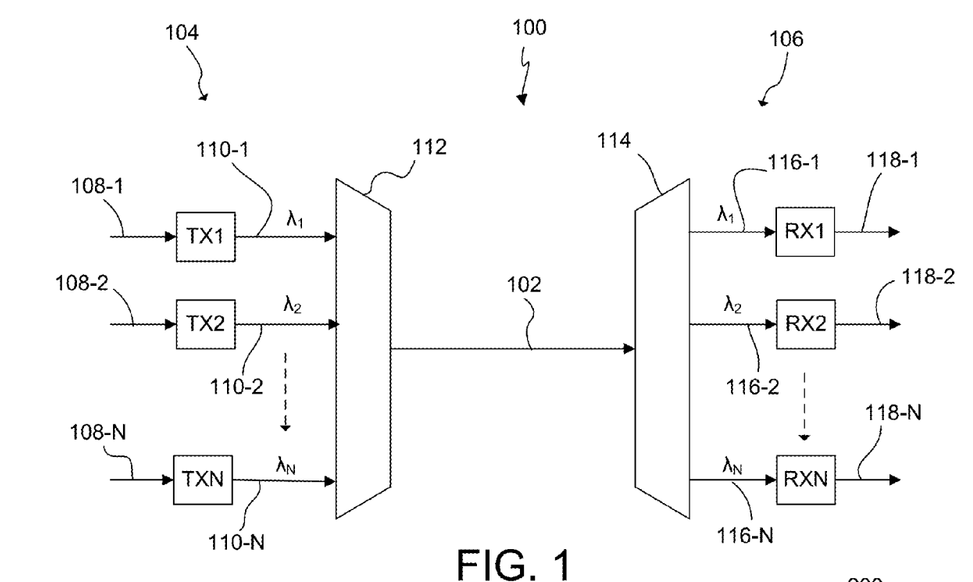
FIG. 1 is a simplified block diagram of one embodiment of a WDM optical communication system consistent with the present disclosure.

FIG. 1 is a simplified block diagram of one exemplary embodiment of a WDM optical communication system 100 consistent with the present disclosure. The optical communication system 100 transmits a plurality of optical channels over an optical information path 102 from a transmitting terminal 104 to one or more remotely located receiving terminals 106. The optical channels (1, 2, . . . N) may be established based on a plurality of corresponding optical carrier wavelengths ($\lambda_1, \lambda_2 \ldots \lambda_N$) such that each channel has a spectral width centered on the respective carrier wavelength (or frequency). As used herein, channel wavelengths refer to the wavelengths associated with the respective channels and may include a band of wavelengths centered on the carrier wavelength associate with a channel.

In the exemplary embodiment, the WDM optical communication system 100 is a dense wavelength division multiplexed (DWDM) system having high spectral efficiencies, i.e., where the spectral width of constituent wavelength (frequency) carriers is larger than the actual frequency spacing among constituents. In example embodiments, the channels (1, 2, . . . N) may have a spacing of 25 GHz, a transmission rate of 100 Gb/s, and a spectral efficiency of 4 bit/s/Hz or 400%. The systems and methods described herein may also have wider or narrower channel spacings, higher or lower transmission rates, and/or a higher or lower spectral efficiency.

The exemplary system 100 may be a long-haul submarine system configured for transmitting the channels from a transmitter to a receiver, for example, at a distance of 5,000 km, or more. The generation of a higher level $n^m$QAM from nQAM signals, consistent with the present disclosure, may also be used in other optical communication systems such as terrestrial systems configured for transmitting from a transmitter to a receiver, for example, at distances in a range of about 2,000 km to 3,000 km. Although exemplary embodiments are described in the context of an optical system, and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may both be configured as transceivers, whereby each may be configured to perform both transmitting and receiving functions. For ease of explanation, however, the terminals are depicted and described herein with respect to only a transmitting or receiving function. A system and method consistent with the disclosure may be incorporated into a wide variety of network components and configurations. The illustrated exemplary embodiments herein are provided only by way of explanation, not of limitation.

In the illustrated exemplary embodiment, a plurality of transmitters TX1, TX2 . . . TXN receive data signals on respective data paths 108-1, 108-2 . . . 108-N and transmit respective optical data signals by modulating the respective optical carrier wavelengths $\lambda_1, \lambda_2 \ldots \lambda_N$ associated with the channels (i.e., 1, 2, . . . N) with the data. One or more of the transmitters TX1, TX2 . . . TXN may be configured to modulate the associated optical carriers using $n^m$QAM generated from nQAM signals, as will be described in greater detail below. The transmitters are shown in highly simplified form for ease of explanation. Each transmitter may include electrical and optical components configured for transmitting the optical signal at its associated wavelength with a desired amplitude and modulation.

The transmitted wavelengths or channels are respectively carried on a plurality of optical paths 110-1, 110-2 . . . 110-N. A multiplexer or combiner 112 combines the channel wavelengths including the modulated optical signals to form an aggregate WDM optical signal on the optical path 102. In one exemplary embodiment, the channel spacing between the combined channels may be 25 GHz or less. The modulated optical data signals may be filtered (e.g., either in the receivers or in the multiplexer/combiner 112) prior to being combined to form the aggregate WDM optical signals. The optical path 102 may include optical fiber waveguides, optical amplifiers, optical filters, dispersion compensating modules, and other active and passive components.

The aggregate WDM optical signal may be received at one or more remote receiving terminals 106. The receiving terminal 106 may include a demultiplexer 114 that separates the transmitted channels at channel wavelengths $\lambda_1, \lambda_2 \ldots \lambda_N$ onto associated paths 116-1, 116-2 . . . 116-N coupled to associated receivers RX1, RX2 . . . RXN. The receivers RX1, RX2 . . . RXN may be configured to demodulate the optical signals on the separated channels and provide associated output data signals on associated output data paths 118-1, 118-2 . . . 118-N. Each receiver may include electrical and optical components configured for receiving and demodulating the optical signal at its associated wavelength. In an example embodiment, the receivers may include a maximum-likelihood sequence estimation (MLSE) detector using a Viterbi algorithm to detect and decode the modulated optical signals by selecting known data patterns that are most likely to correspond to the received symbols. Other types of detectors or detection techniques may also be used, such as maximum aposteriori probability (MAP) detection described in greater detail in U.S. Patent Application Publication Nos. 2010/0232809, 2010/0232797, and 2010/0232796, which are incorporated herein by reference.

Figure 2:
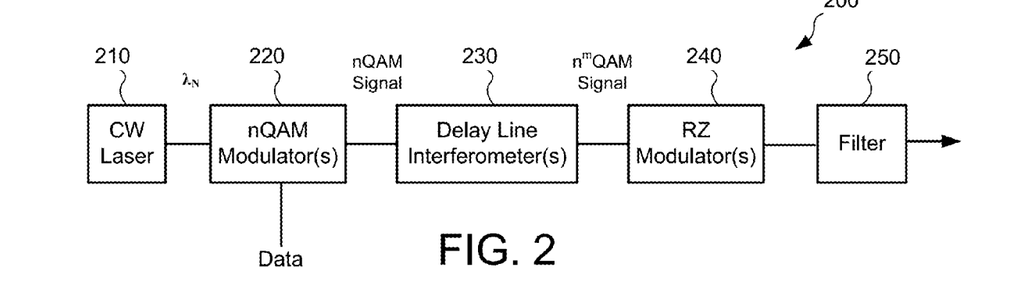
FIG. 2 is a simplified block diagram of one embodiment of a transmitter for generating higher-level $n^m$ QAM from nQAM signals using one or more delay line interferometers (DLIs), consistent with the present disclosure.

FIG. 2 is a simplified block diagram of one embodiment of a transmitter 200 consistent with the present disclosure. In general, the transmitter 200 includes at least one continuous wave laser 210 that provides a continuous wave optical carrier with a wavelength $\lambda_N$, one or more nQAM modulators 220 that modulate the optical carrier with one or more binary data streams using nQAM to generate nQAM signals, and one or more delay line interferometers (DLIs) 230 that generate correlated $n^m$QAM signals from the nQAM signals. The transmitter 200 may also include one or more RZ modulators 240 that provide RZ modulation of the $n^m$QAM signals output from the DLI(s) 230 to remove redundant symbols. The transmitter 200 may further include one or more optical pre-filtering filters 250 after the RZ modulator(s) 240 to control the $n^m$QAM signal bandwidth from the transmitter 200. Although the present disclosure describes embodiments in which n is 2, 4, or 16 and m is 2, 3, or 4, n could be other integers greater than 1 and m could be other integers greater than 0.

Various embodiments are described herein with different types and configurations of the nQAM modulator(s) 220 and different types and configurations of the DLI(s) 230. The nQAM modulator(s) 220 may include, without limitation, BPSK modulators, QPSK modulators, and higher-level nQAM modulators (e.g., 16QAM). The nQAM modulator(s) 220 may also have various bit rates and baud rates. The DLI(s) 230 may provide different time delays, free spectral range (FSR) values, phase parameters, and/or amplitude (or loss) imbalance parameters depending upon the nQAM signal and the desired $n^m$QAM signal to be generated. The transmitter 200 may also be configured to provide phase division multiplexed (PDM) modulation, for example, using multiple nQAM modulators 220, DLIs 230 and RZ modulators 240 in parallel modulation paths to produce $n^m$QAM signals that are combined with different polarizations (e.g., orthogonal polarizations).

Figure 3:
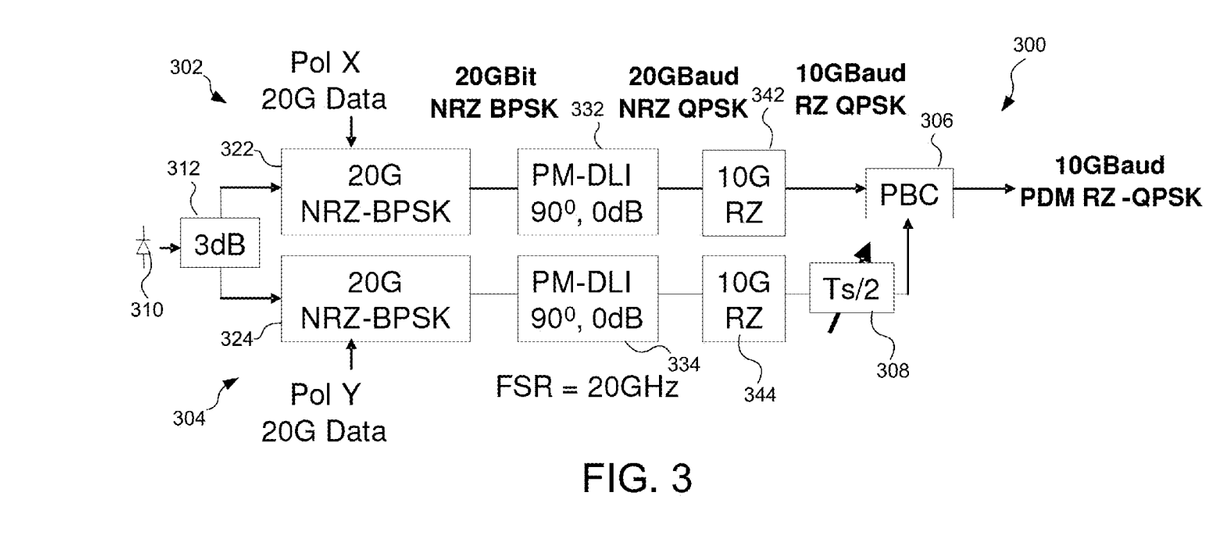
FIG. 3 is a simplified block diagram of another embodiment of a transmitter for generating QPSK modulation from a BPSK modulated signal using a DLI, consistent with the present disclosure.
Figure 3A:
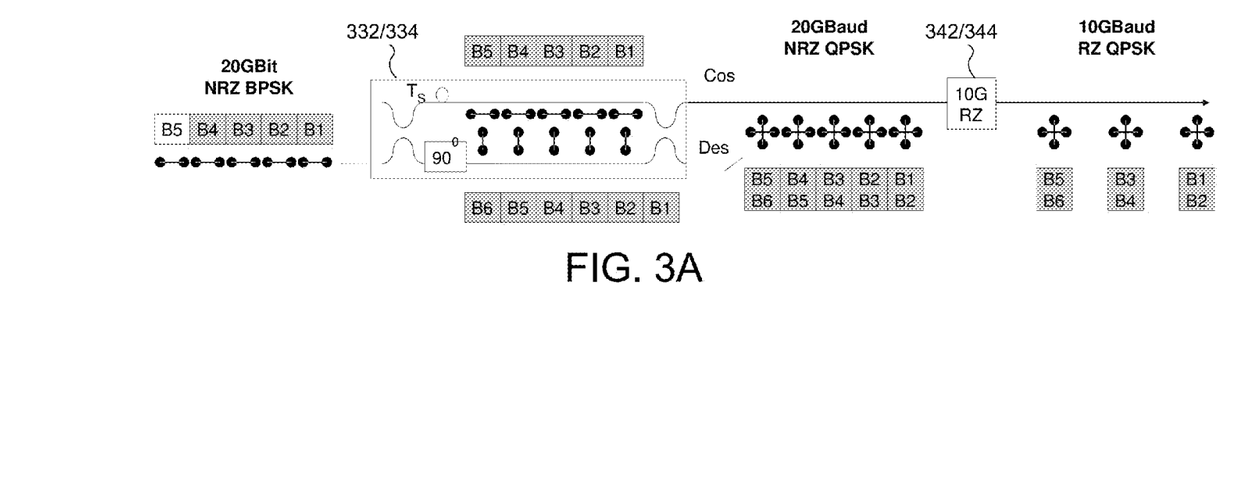
FIG. 3A is a schematic diagram illustrating a constellation change from BPSK to QPSK over a modulation path in the transmitter shown in FIG. 3.

Referring to FIGS. 3 and 3A, one embodiment of a transmitter 300, consistent with the present disclosure, is configured to generate QPSK from BPSK (i.e., $2^2$QAM generation from 2QAM). In the illustrated embodiment, polarization division multiplexed (PDM) RZ-QPSK is generated from NRZ-BPSK, although the same concepts may be used to generate other forms of QPSK from BPSK. The example embodiment also shows a 40 GBit PDM RZ-QPSK signal generated from 20 GBit BPSK signals, although other transmission rates are within the scope of the present disclosure.

The transmitter 300 includes a continuous wave laser 310 for generating an optical carrier at a channel wavelength and a coupler 312 (e.g., a 3 dB coupler) for splitting the optical carrier between first and second modulation paths 302, 304 that correspond to different polarizations (Pol X and Pol Y). Multiple lasers may also be used to generate first and second optical carriers at the same carrier wavelength $\lambda_N$ for the respective first and second modulation paths 302, 304. The modulation paths 302, 304 provide the modulation to generate QPSK from BPSK. A polarization beam combiner (PBC) 306 combines the modulated signals on the modulation paths 302, 304 with different polarizations (e.g., orthogonal polarization) to produce a PDM-QPSK modulated signal. One of the modulation paths 302, 304 also includes a tunable delay element 308 to provide an adjustable delay relative to the other path.

The first and second modulation paths 302, 304 include, respectively, first and second BPSK modulators 322, 324 for modulating the optical carrier with respective binary RF driving signals, first and second DLIs 332, 334 for generating correlated QPSK signals, and RZ modulators 342, 344 for RZ modulating the QPSK signals to remove redundant symbols. The BPSK modulators 322, 324 may include non-return-to-zero (NRZ)-BPSK modulators. Each of the BPSK modulators 322, 324 may receive a single binary RF driving signal (e.g., Pol X 20G Data and Pol Y 20G Data) provided by BPSK drivers (not shown). In other non-PDM embodiments, a single modulation path may be used, for example, with a BPSK modulator, a DLI, and RZ modulator.

The DLIs 332, 334 provide a one symbol delay on one of the arms and have parameters selected to generate QPSK signals from BPSK signals. In the example embodiment, the DLIs 332, 334 have a free spectral range equal to the symbol rate or baud rate of the BPSK signals (e.g., FSR=20 GHz for a 20 GBaud rate), are balanced in terms of loss (e.g., 0 dB amplitude imbalance), and have a 90° phase shift between two interferometer arms. Thus, the QPSK signal is generated at the output of the constructive port of each of the DLIs with correlation between neighboring symbols as represented by Equation 1:

$$E_{con}(t) = \frac{1}{2}(e^{j\pi/2}E(t) + E(t-T)) \quad (1)$$

where E(t) is the BPSK signal at the input port of the DLI and T is the bit period.

As shown in FIG. 3A, the BPSK signal output from the BPSK modulator 322/324 includes a series of symbols (B5, B4, B3, B2, B1) each having two (2) constellation points. In the DLI 332/334, the 90° phase shift rotates the constellations of symbols on one arm and the time delay shifts the symbols on one arm. The symbols generated at the output of the DLI 332/334 have 4 constellation points, which is the same as a conventional QPSK signal constellation. Thus, the NRZ-QPSK signal at the output of the DLI 332/334 is the same as a conventional QPSK signal, except that every other symbol includes redundant information and may be removed while retaining the information from the original data stream.

The RZ modulator 342/344 modulates the QPSK signal generated at the output of the DLI 322/324 to remove every other symbol and demux an NRZ-QPSK signal to a RZ-QPSK signal with half the baud rate (e.g., from 20 GBaud to 10 GBaud using a 10G RZ modulator). The RZ modulator 342/344 may be driven by a 5G sine wave or 5G square wave with the modulator biased at the transmission max/min, or may be driven by 10G sine wave/square wave with the modulator biased at the quadrature point.

Figure 4:
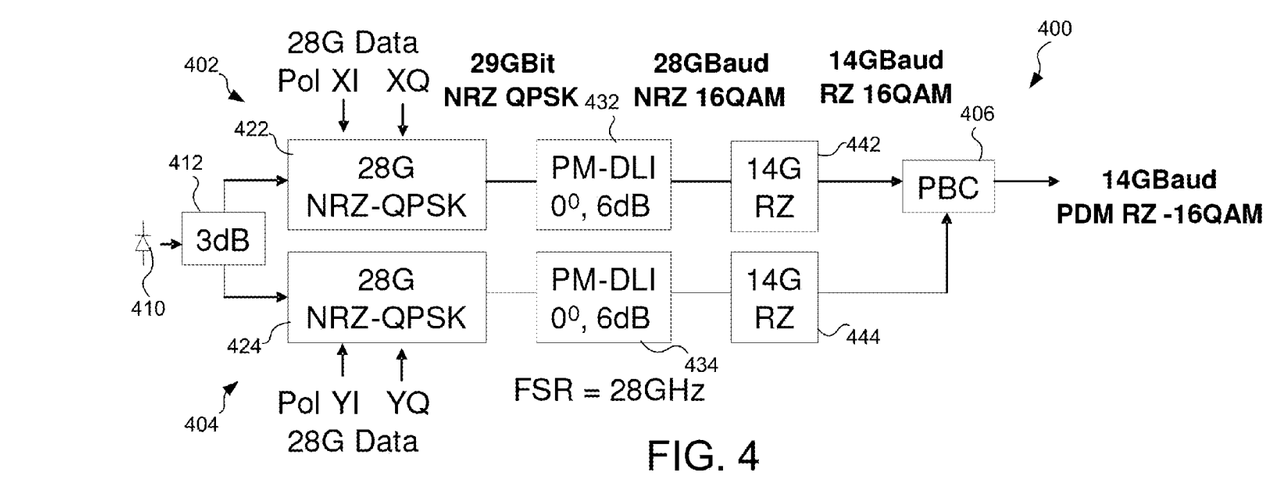
FIG. 4 is a simplified block diagram of another embodiment of a transmitter for generating 16QAM from a QPSK modulated signal using a DLI, consistent with the present disclosure.
Figure 4A:
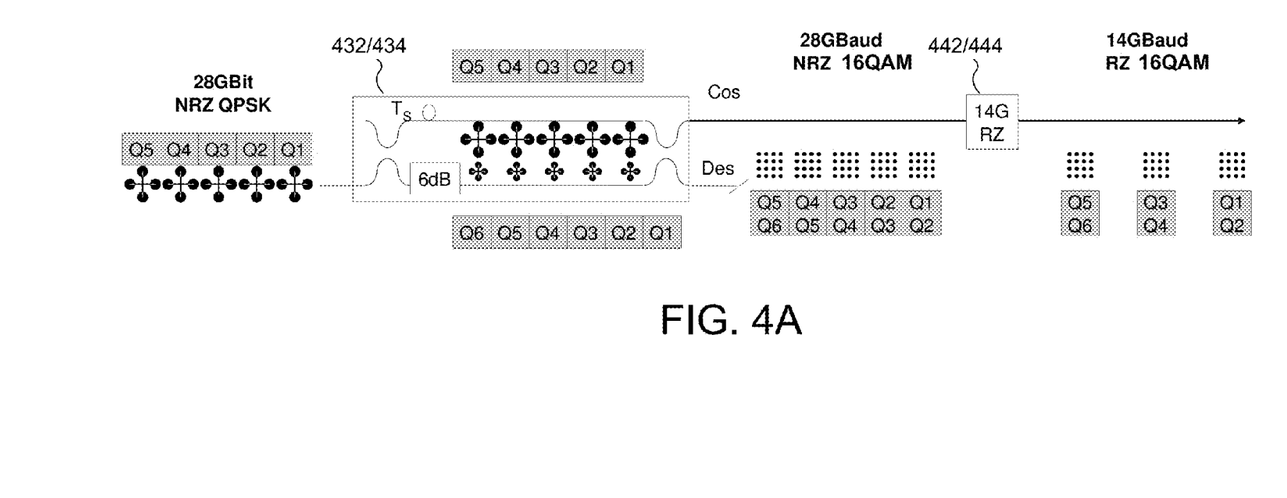
FIG. 4A is a schematic diagram illustrating a constellation change from QPSK to 16QAM over a modulation path in the transmitter shown in FIG. 4.

Referring to FIGS. 4 and 4A, another embodiment of a transmitter 400, consistent with the present disclosure, is configured to generate 16QAM from QPSK (i.e., $4^2$QAM generation from 4QAM). In the illustrated embodiment, PDM RZ-16QAM is generated from NRZ-QPSK, although the same concepts may be used to generate other forms of 16QAM from QPSK. The example embodiment also shows a 100GBit PDM RZ-16QAM signal generated from 28 GBit QPSK signals, although other transmission rates are within the scope of the present disclosure.

The transmitter 400 includes a continuous wave laser 410 for generating an optical carrier at a channel wavelength and a coupler 412 (e.g., a 3 dB coupler) for splitting the optical carrier between first and second modulation paths 402, 404 that correspond to different polarizations (Pol X and Pol Y). The modulation paths 402, 404 provide the modulation to generate 16QAM from QPSK. A PBC 406 combines the modulated signals on the modulation paths 402, 404 with different polarizations (e.g., orthogonal polarization) to produce a PDM-16QAM signal.

The first and second modulation paths 402, 404 include, respectively, first and second QPSK modulators 422, 424 for modulating the optical carrier with respective binary RF driving signals, first and second DLIs 432, 434 for correlating the QPSK signals to generate 16QAM signals, and RZ modulators 442, 444 for RZ modulating the 16QAM signals to remove redundant symbols. The QPSK modulators 422, 424 may include NRZ-QPSK modulators. Each of the QPSK modulators 422, 424 may receive in-phase (I) and quadrature-phase (Q) binary signals provided by QPSK drivers (not shown). In other non-PDM embodiments, a single modulation path may be used, for example, with a QPSK modulator, a DLI, and RZ modulator.

The DLIs 432, 434 provide a one symbol delay on one of the arms and have parameters selected to generate 16QAM signals from QPSK signals. In the example embodiment, the DLIs 432, 434 have a free spectral range equal to the QPSK baud rate (e.g., FSR=28GHz for a 28 GBaud rate). The output signal from the constructive port of each of the DLIs 432, 434 has a correlation between two neighboring symbols and the correlation may be controlled using the phase parameter ( ) and/or the amplitude imbalance parameter (α) of the DLI. The 16QAM signal generated at the output of the constructive port of each of the DLIs may be generally represented by Equation 2:

$$E_{con}(t) = \frac{1}{2}(\alpha e^{j\phi} E(t) + E(t-T)) \quad (2)$$

In one example, the DLI may be phase aligned with =0 and amplitude imbalanced with α=0.5 (e.g., with 20 log 10(α) =−6 dB attenuation in one arm). In this example, the 16QAM signal generated at the output of the constructive port of each of the DLIs may be represented by Equation 3:

$$E_{con}(t) = \frac{1}{2}\left(\frac{1}{2}E(t) + E(t-T)\right) \quad (3)$$

In another example, the DLI may have a phase offset of π/4 with both arms of the DLI balanced and the 16QAM signal generated at the output of the constructive port of each of the DLIs may be represented by Equation 4:

$$E_{con}(t) = \frac{1}{2}(e^{j\pi/4} E(t) + E(t-T)) \quad (4)$$

As shown in FIG. 4A, the QPSK signal output from the QPSK modulator 422/424 includes a series of symbols (Q5, Q4, Q3, Q2, Q1) each having four (4) constellation points. In the DLI 432/434, the amplitude imbalance (e.g., the 6 dB attenuation on one arm) reduces the amplitude of the symbols on one arm and the time delay shifts the symbols on one arm. When these neighboring symbols are summed together in the DLI 432/434, the symbols generated at the output of the DLI 432/434 have sixteen (16) constellation points, which is a form of 16QAM. For the example of the DLI with the phase alignment and amplitude imbalance, the constellations are the same as rectangular 16QAM (FIG. 4A). For the example of the DLI with a phase offset of π/4, the constellations are the same as circular 16QAM (not shown). Other different 16QAM constellations may be generated by changing the phase parameter ( ) and/or the amplitude imbalance parameter (α) of the DLI as long as the parameters satisfy the relationship $\alpha e^{j\phi} \neq 1$.

Although the constellations are the same as 16QAM, the NRZ-16QAM signals at the output of the DLI 432/434 are different from conventional 16QAM in that every other symbol contains redundant information and the baud rate is twice that of conventional 16QAM. The RZ modulator 442/444 modulates the NRZ-16QAM signal to remove every other symbol and demux an NRZ-16QAM signal to a RZ-16QAM signal with half the baud rate (e.g., from 28 GBaud to 14 GBaud using a 14G RZ modulator). The RZ modulator 442/444 may be driven by a 7G sine wave or 7G square wave with the modulator biased at the transmission max/min, or may be driven by 14G sine wave/square wave with the modulator biased at the quadrature point.

Figure 5:
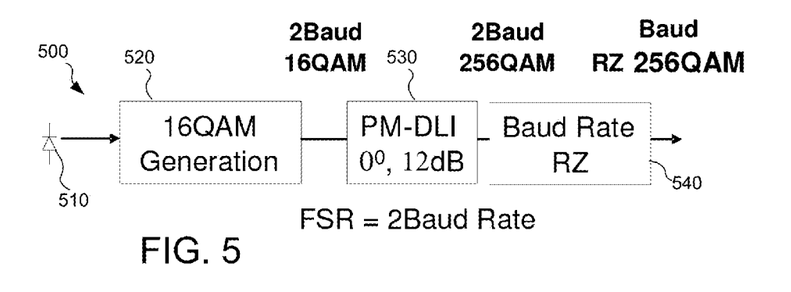
FIG. 5 is a simplified block diagram of yet another embodiment of a transmitter for generating 256QAM from a 16QAM signal using a DLI, consistent with the present disclosure.
Figure 5A:
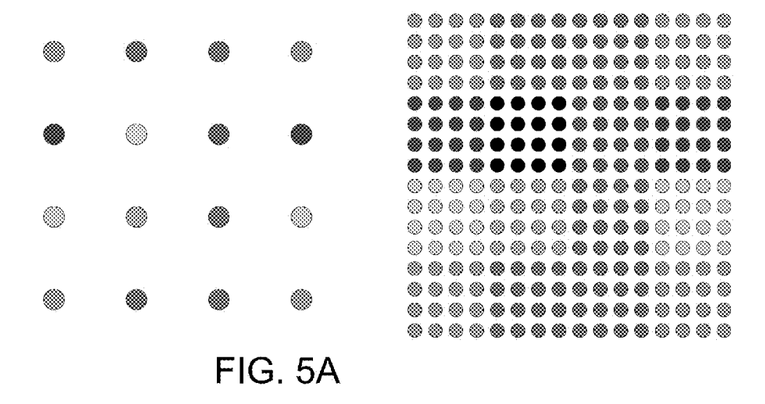
FIG. 5A is a schematic diagram illustrating a constellation change from 16QAM to 256QAM in the transmitter shown in FIG. 5.

Referring to FIGS. 5 and 5A, a further embodiment of a transmitter 500, consistent with the present disclosure, is configured to generate 256QAM from 16QAM (i.e., $16^2$QAM generation from 16QAM). The transmitter 500 includes a laser 510, a 16QAM modulator 520, a DLI 530, and an RZ modulator 540. In this embodiment, the DLI is phase aligned but amplitude imbalanced with a 12 dB attenuation in one arm. The RZ modulator 540 RZ modulates the 256QAM to remove every other symbol and demuxes the NRZ-256QAM signal output from the DLI 530 to an RZ-256QAM signal. In the example embodiment, the 16QAM signal is twice the baud rate (BR) of the RZ-256QAM signal, the DLI 530 has an FSR=2BR, and the RZ modulator 540 provides RZ modulation at the baud rate to demux the NRZ-256QAM signal from 2BR to BR. As shown in FIG. 5A, a 16QAM constellation is generated after the 16QAM modulator 520 and a 256QAM constellation is generated after the DLI 530.

Figure 6:
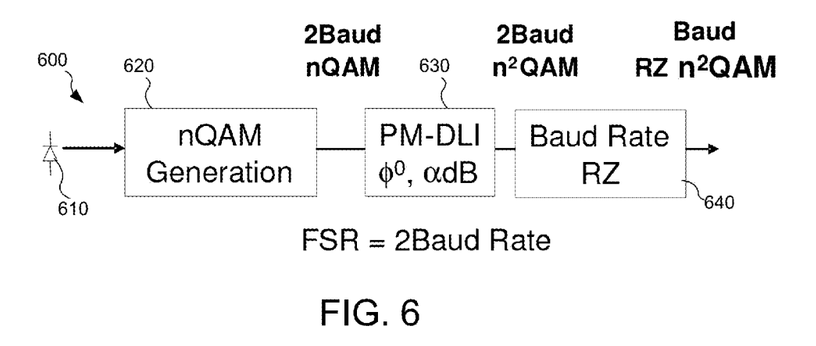
FIG. 6 is a simplified block diagram of a further embodiment of a transmitter for generating $n^2$QAM from a nQAM signal using a DLI, consistent with the present disclosure.

FIG. 6 shows a generalized embodiment of a transmitter 600, consistent with the present disclosure, configured to generate $n^2$QAM from nQAM. In this generalized embodiment, the transmitter 600 includes a laser 610, nQAM modulator 620, DLI 630, and RZ modulator 640. The DLI 630 upgrades the signal constellation of the nQAM signal to the $n^2$QAM signal constellation according to the following Equation 5:

$$E_{con}(t) = \frac{1}{2}(\alpha e^{j\phi} E(t) + E(t-T)) \quad (5)$$

In order to avoid degeneracy where the number of constellation points is less than $n^2$, the DLI phase ( ) and imbalance (α)

parameters satisfy $\alpha e^{j\Phi} \neq 1$. Table I sets forth the DLI parameters for generating rectangular QAM constellations for $n^2$=4, 16, 64, 256, and 1024.

TABLE I

| n | 2 (BPSK) | 4 (QPSK) | 4 (QPSK) | 16 (16QAM) |
|---|---|---|---|---|
| $n^2$ | 4 (QPSK | 16 (rectangular 16QAM) | 16 (circular 16QAM) | 256 (256QAM) |
| Phase (degree) | 90 | 0 | 45 | 0 |
| Attn ($\alpha$ dB) | 0 | 6 | 0 | 12 |

Similar to the other embodiments described above, the RZ modulator 640 modulates the $n^2$QAM signal at the baud rate (BR) using a sine wave or square wave to remove symbols with redundant information from the modulated data stream and cut the baud rate by half.

Figure 7:
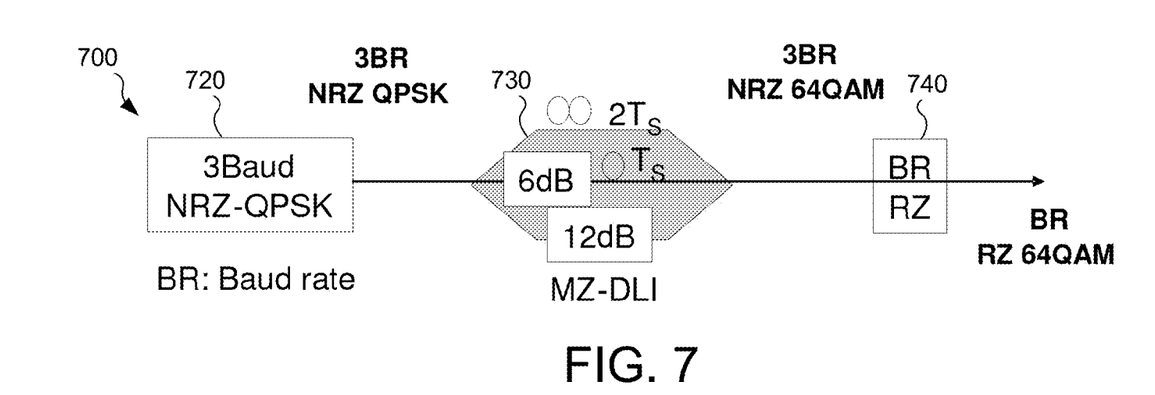
FIG. 7 is a simplified block diagram of yet another embodiment of a transmitter for generating 64QAM from a QPSK modulated signal using a single DLI, consistent with the present disclosure.
Figure 7A:
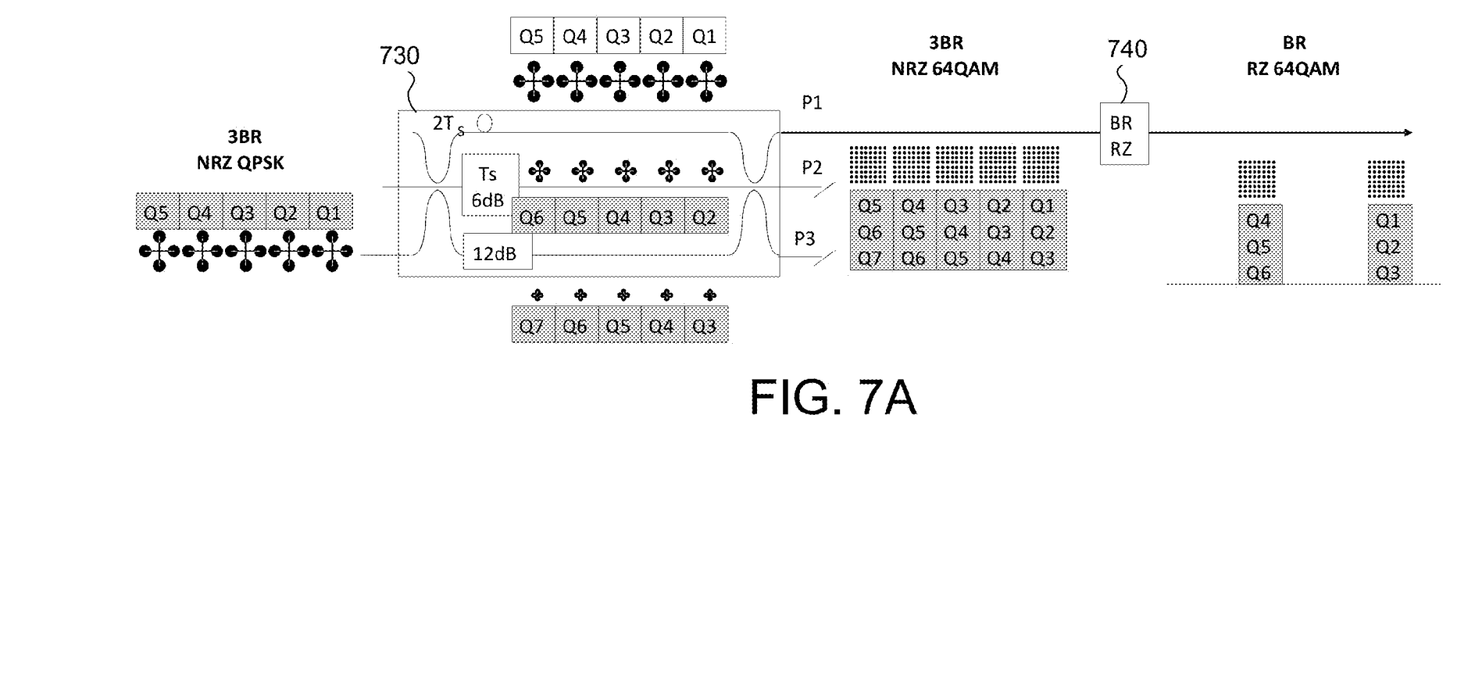
FIG. 7A is a schematic diagram illustrating a constellation change from QPSK to 64QAM over a modulation path in the transmitter shown in FIG. 7.

Referring to FIGS. 7 and 7A, yet another embodiment of a transmitter 700, consistent with the present disclosure, is configured to generate 64QAM from QPSK (i.e., $4^3$QAM generation from 4QAM). The transmitter 700 includes a QPSK modulator 720, a 3-arm DLI 730, and RZ modulator 740. The 3-arm DLI 730 provides a delay of one symbol period (Ts) on one arm and two symbol periods (2Ts) on the another arm. The example embodiment of the DLI 730 is phase aligned (0°) but amplitude imbalanced, for example, with 6 dB attenuation in one arm and 12 dB attenuation in another arm.

As shown in FIG. 7A, the QPSK signal output from the QPSK modulator 720 includes a series of symbols (Q5, Q4, Q3, Q2, Q1) each having four (4) constellation points. In the 3-arm DLI 730, the amplitude imbalance reduces the amplitude of the symbols on the two arms with the attenuation and the time delay shifts the symbols on the two arms with a time delay. When these three neighboring symbols are correlated in the 3-arm DLI 730, the symbols generated at the output of the 3-arm DLI 730 have 64 constellation points, which is a form of 64QAM.

In this embodiment, the NRZ-64QAM signal output from the DLI 730 includes 2 out of 3 symbols containing redundant information. The RZ modulator 740 RZ modulates the NRZ-64QAM signal output from the DLI 730 with a pulse width <33% to suppress the symbols with the redundant information and produce an RZ-64QAM signal. In this embodiment, the QPSK signal and the NRZ-64QAM signal are three times the Baud Rate (3BR) of the RZ-64QAM signal. The RZ modulator 740 provides RZ modulation at the baud rate to remove the symbols with redundant information from the 3BR NRZ-64QAM signal and achieve BR RZ-64QAM.

Figure 8:
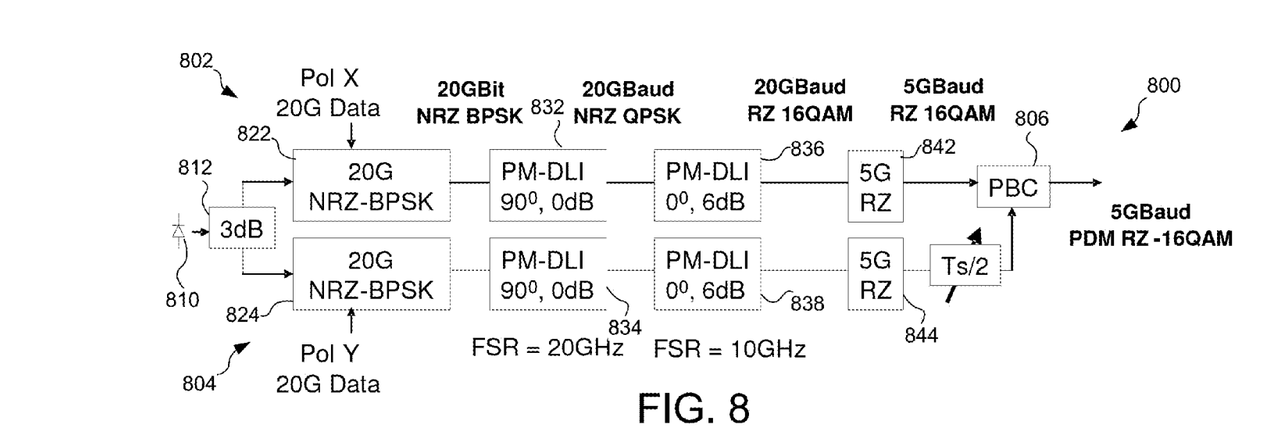
FIG. 8 is a simplified block diagram of yet another embodiment of a transmitter for generating 16QAM from a BPSK modulated signal using tandem DLIs, consistent with the present disclosure.
Figure 8A:
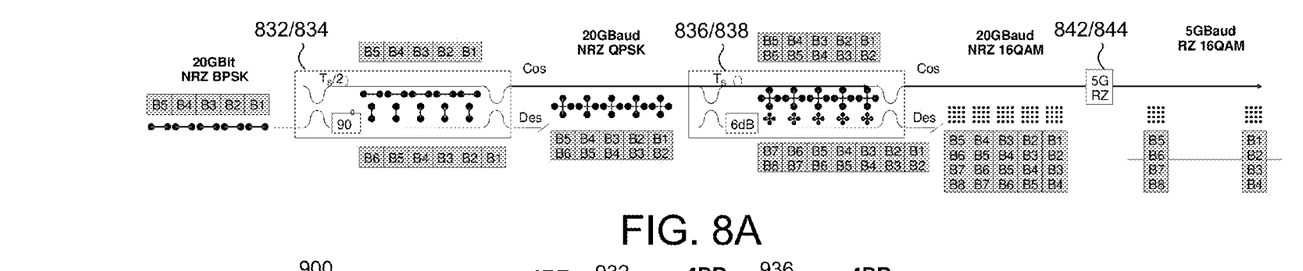
FIG. 8A is a schematic diagram illustrating a constellation change from BPSK to 16QAM over a modulation path in the transmitter shown in FIG. 8.

Referring to FIGS. 8 and 8A, yet another embodiment of a transmitter 800, consistent with the present disclosure, is configured to generate 16QAM from BPSK (i.e., $2^4$QAM generation from 2QAM). In the illustrated embodiment, PDM RZ-16QAM is generated from NRZ-BPSK, although the same concepts may be used to generate other forms of 16QAM from BPSK. The example embodiment also shows a 40 GBit PDM RZ-16QAM signal generated from 20 GBit QPSK signals, although other transmission rates are within the scope of the present disclosure.

The transmitter 800 includes a continuous wave laser 810 for generating an optical carrier at a channel wavelength and a coupler 812 (e.g., a 3 dB coupler) for splitting the optical carrier between first and second modulation paths 802, 804 that correspond to different polarizations (Pol X and Pol Y). The modulation paths 802, 804 provide the modulation to generate 16QAM from BPSK. A PBC 806 combines the modulated signals on the modulation paths 802, 804 with different polarizations (e.g., orthogonal polarization) to produce a PDM-16QAM signal.

In this embodiment, each of the modulation paths 802, 804 include tandem DLIs 832, 836, 834, 838 following BPSK modulators 822, 824. In each of the modulation paths 802, 804, the tandem DLIs have different FSR values, phase offsets and amplitude imbalance to convert the BPSK signals into 16QAM signals. In the illustrated embodiment, for example, the first DLIs 832, 834 in the modulation paths 802, 804 have a FSR of 20 GHz, a phase offset of 90°, and zero amplitude imbalance and the second DLIs 836, 838 in the modulation paths 802, 804 have a FSR of 10 GHz, zero phase offset and an amplitude imbalance (e.g., 0 dB/6 dB).

As shown in FIG. 8A, the BPSK signal output from the BPSK modulator 822/824 includes a series of symbols (B5, B4, B3, B2, B1) each having two (2) constellation points. In the first DLI 832/834 on the modulation path, the 90° phase shift rotates the constellations of symbols on one arm and the time delay shifts the symbols on one arm. When these symbols are correlated in the DLI 832/834, the QPSK signal generated at the output of the DLI 832/834 has 4 constellation points. In the second DLI 836/838 on the modulation path, the amplitude imbalance reduces the amplitude of the symbols on one arm and the time delay shifts the symbols on one arm. When these neighboring symbols are correlated in the second DLI 836/838, the symbols generated at the output of the DLI 836/838 have sixteen (16) constellation points, which is a form of 16QAM.

In the NRZ-16QAM signal at the output of the DLI 836/838, however, 1 out of 4 symbols is independent and 3 out of 4 symbols contain redundant information. An RZ modulator 842/844 on each modulation path RZ modulates the NRZ-16QAM signal to remove the symbols that contain redundant information. To remove 3 out of every 4 symbols, the RZ modulator 842/844 may be driven by an RZ pulse train with a 25% duty cycle. In the example embodiment where the NRZ-16QAM signal is 20 GBaud, the RZ modulator 842/844 may be driven by a 5G sine or square wave to reduce the 20 GBaud NRZ-16QAM signal to a 5 GBaud RZ-16QAM signal.

Figure 9:
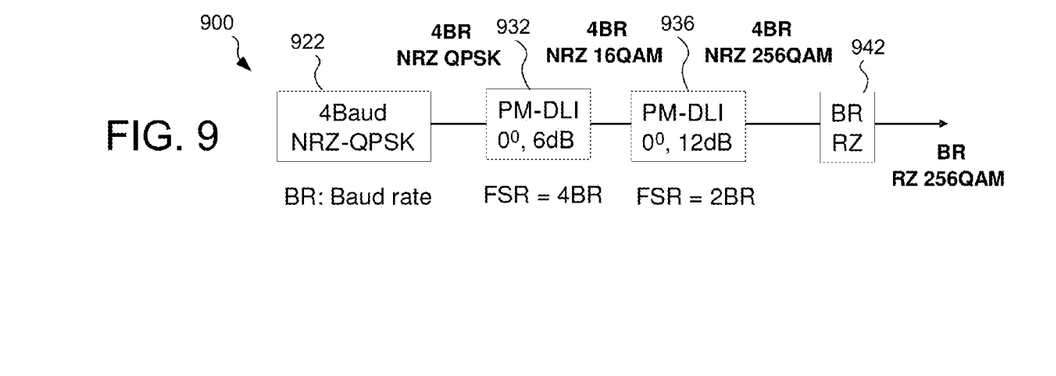
FIG. 9 is a simplified block diagram of yet another embodiment of a transmitter for generating 256QAM from a QPSK modulated signal using tandem DLIs, consistent with the present disclosure.

Referring to FIG. 9, yet another embodiment of a transmitter 900, consistent with the present disclosure, is configured to generate 256QAM from QPSK (i.e., $4^4$QAM generation from 4QAM). In this embodiment, the transmitter 900 includes tandem DLIs 932, 936 following a QPSK modulator 922. The tandem DLIs 932, 936 have different FSR values (e.g., 4 BR and 2 BR) and different amplitude imbalance (e.g., 6 dB and 12 dB) but both are phase aligned. A NRZ-16QAM signal is generated after the DLI 932 and a NRZ-256QAM is generated after the DLI 936. In the NRZ-256QAM signal, 1 out of 4 symbols is independent and 3 out of 4 symbols contain redundant information. An RZ modulator 942 driven by an RZ pulse train with a 25% duty cycle modulates the 16QAM signal to remove the symbols containing redundant information. In this embodiment, the QPSK signal, the NRZ-16QAM signal, and the NRZ-256QAM signal are four times the baud rate (4BR) of the RZ-256QAM signal. The RZ modulator 942 provides the RZ modulation at the baud rate to remove the symbols with redundant information from the 4BR NRZ-256QAM signal and achieve BR RZ-256QAM.

Figure 10:
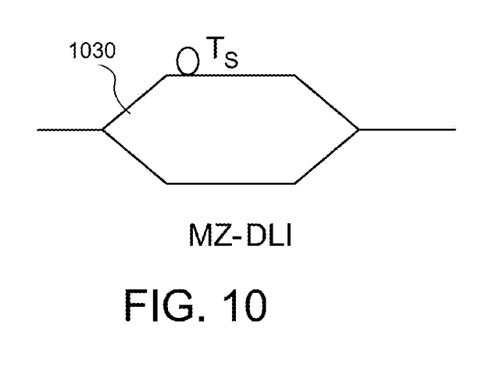
FIG. 10 is a simplified diagram of a stitching DLI for generating NRZ-$n^2$QAM from an RZ-$n^2$QAM signal, consistent with the present disclosure.
Figure 11:
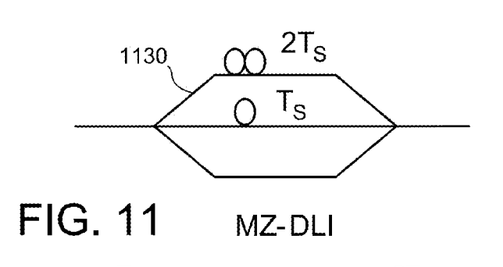
FIG. 11 is a simplified diagram of a three arm stitching DLI for generating NRZ-$n^3$QAM from an RZ-$n^3$QAM signal, consistent with the present disclosure.
Figure 12:
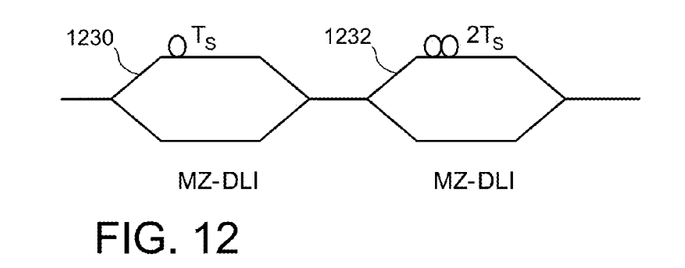
FIG. 12 is a simplified diagram of tandem stitching DLIs for generating NRZ-$n^4$QAM from an RZ-$n^4$QAM signal, consistent with the present disclosure.

As discussed above, the RZ modulation to remove the symbols containing redundant information results in an RZ $n^m$QAM signal. Referring to FIGS. 10-12, a transmitter, consistent with any of the embodiments described herein, may include one or more stitching DLIs that implement a stitching method to generate an NRZ-$n^m$QAM signal from the RZ- $n^m$QAM signal output from the RZ modulator. The amplitude and phase of the stitching DLI(s) may be controlled to generate continuous amplitude and phase after the stitching. In these embodiments, the stitching DLIs may include single mode fiber (SMF).

Figure 10A:
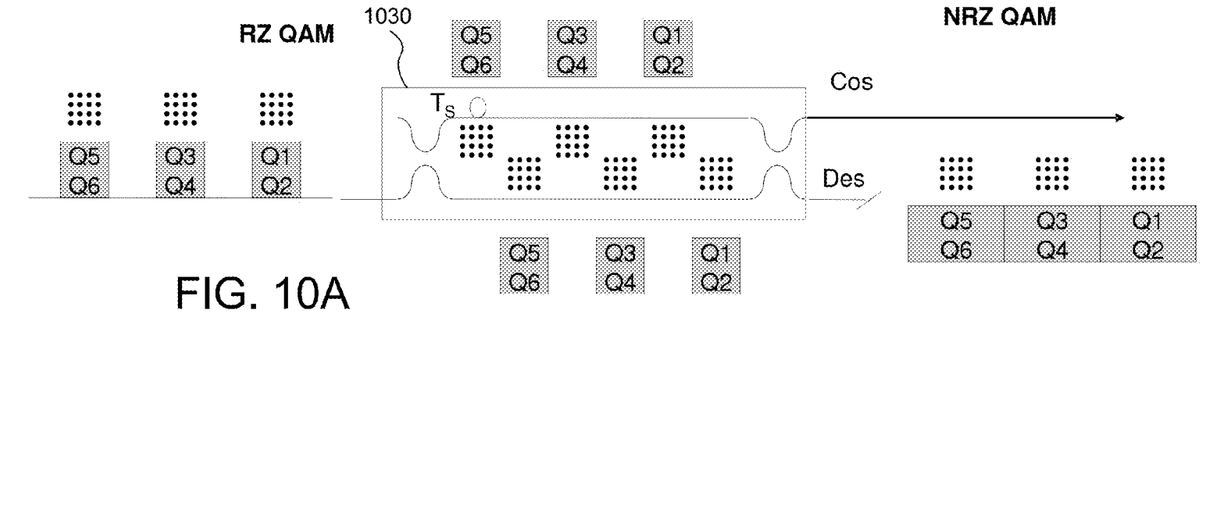
FIG. 10A is a schematic diagram illustrating a constellation change from RZ-$n^2$QAM to NRZ $n^2$QAM using a stitching technique across the stitching DLI shown in FIG. 10.

As shown in FIGS. 10 and 10A, a DLI 1030, such as a Mach-Zehnder (MZ) DLI, generates an NRZ-$n^2$QAM signal from an RZ-$n^2$QAM signal using the stitching technique. As shown, the DLI 1030 correlates the RZ-$n^2$QAM signal (e.g., an RZ-16QAM signal) to generate the NRZ-$n^2$QAM signal at the constructive port of the DLI 1030. As shown in FIG. 11, a 3-arm DLI 1130 with a two symbol delay (2Ts) on one arm and a one symbol delay (Ts) on another arm may be used to stitch an RZ-$n^3$QAM signal back to an NRZ-$n^3$QAM signal. As shown in FIG. 12, tandem DLIs 1230, 1232 may be used to stitch an RZ-$n^4$QAM back to NRZ-$n^4$QAM. The first DLI 1230 provides a one symbol delay (Ts) and the second DLI 1232 provides a two symbol delay (Ts). Other configurations of DLIs may also be used to provide the desired stitching.

Figure 13:
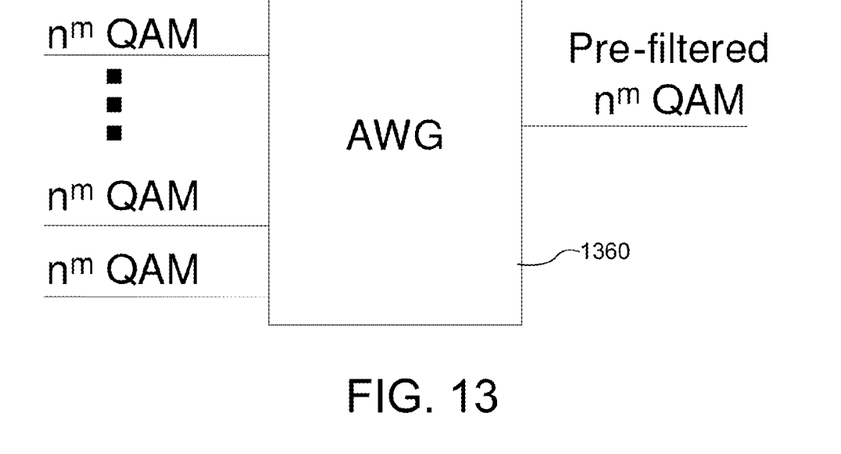
FIG. 13 is a simplified diagram of an arrayed waveguide grating (AWG) for filtering and combining $n^m$ QAM optical signals, consistent with the present disclosure.
Figure 14:
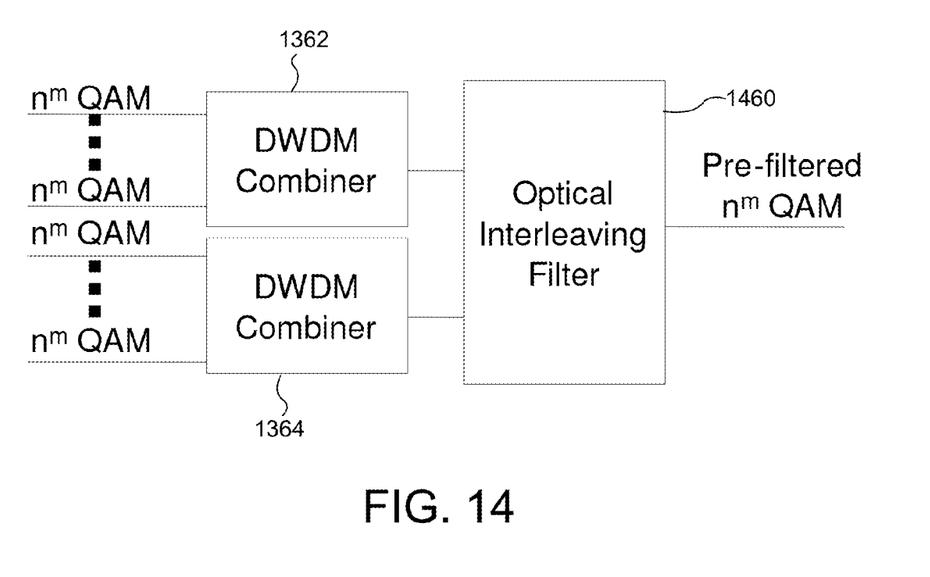
FIG. 14 is a simplified diagram of an optical interleaving filter for filtering and combining $n^m$ QAM optical signals, consistent with the present disclosure.

Referring to FIGS. 13 and 14, the $n^m$QAM signals may be pre-filtered before transmission in a WDM optical communication system to improve spectral efficiency. The $n^m$QAM signals, and particularly the $n^3$QAM and $n^4$QAM signals, have a broader optical spectrum. The $n^m$QAM signals may be pre-filtered when the $n^m$QAM signals are combined with other $n^m$QAM signals on different channel wavelengths. As shown in FIG. 13, an arrayed waveguide grating (AWG) 1360 may be used in a transmitting terminal to pre-filter and combine the $n^m$QAM signals. As shown in FIG. 14, a transmitting terminal may include DWDM combiners 1462, 1464 to combine $n^m$QAM signals and an optical interleaving filter 1460 to pre-filter the $n^m$QAM signals.

Accordingly, one or more delay line interferometers (DLIs) arranged in various configurations may be used to generate higher level $n^m$QAM from nQAM signals. The DLI(s) may be used with lower level modulators (e.g., BPSK, QPSK, or 16QAM) with binary driving signals. The higher level $n^m$QAM signals may thus be generated using fewer components than conventional QAM systems.

Consistent with one aspect of the disclosure, an optical communication method includes: modulating at least one optical carrier at a channel wavelength with a binary data stream using at least one nQAM modulator to provide at least one nQAM signal, where n is an integer greater than one (1); and coupling the at least one nQAM signal into at least one delay line interferometer (DLI) to generate at least one $n^m$QAM signal, where m is an integer; and transmitting the at least one $n^m$QAM signal over an optical transmission path.

Consistent with another aspect of the disclosure, an optical transmitter includes at least one nQAM modulator configured to modulate an optical carrier at a channel wavelength with a binary data stream using nQAM modulation to provide at least one nQAM signal, where n is an integer greater than one (1). The optical transmitter also includes at least one delay line interferometer (DLI) configured to generate at least one $n^m$QAM signal from the nQAM signal, where m is an integer greater than zero (0).

Consistent with a further aspect of the disclosure, an optical communication system includes a transmitting terminal configured to modulate a plurality of channel wavelengths with a plurality of binary data streams using nQAM modulation to provide nQAM signals, where n is an integer greater than one (1), configured to generate a plurality of $n^m$QAM signals from the nQAM signals, respectively, using delay line interferometers, where m is an integer, and configured to combine the $n^m$QAM signals into an aggregate WDM optical signal including multiple channels. The optical communication system also includes an optical path configured to carry the WDM optical signal and a receiving terminal configured to separate the $n^m$QAM signals on the transmitted channels at the associated wavelengths in the WDM optical signal, and configured to detect and decode the $n^m$QAM signals to provide associated output data signals, respectively.

The embodiments that have been described herein but some of the several which utilize a system or method consistent with the present disclosure and are set forth herein by way of illustration but not of limitation. Many other embodiments, which will be readily apparent to those skilled in the art, may be made without departing materially from the spirit and scope of the disclosure.

What is claimed is:

1. An optical communication method comprising:

modulating at least one optical carrier at a channel wavelength with a binary data stream using at least one nQAM modulator to provide at least one nQAM signal, where n is an integer greater than one (1); and coupling the at least one nQAM signal into at least one delay line interferometer (DLI) to generate at least one $n^m$QAM signal, where m is an integer greater than 1, wherein the DLI splits the nQAM signal into at least first and second nQAM signals on at least first and second DLI arms, and wherein at least one of the first and second DLI arms provides a time delay sufficient for a one symbol shift such that at least one of the at least first and second nQAM signals is shifted by one symbol relative to another of the at least first and second nQAM signals; and transmitting the at least one $n^m$QAM signal over an optical transmission path.

2. The optical communication method of claim 1 further comprising modulating the $n^m$QAM signal with a return-to-zero (RZ) modulator prior to transmitting the $n^m$QAM signal to remove redundant symbols.

3. The optical communication method of claim 1 wherein m is the integer two (2).

4. The optical communication method of claim 3 wherein the at least one nQAM modulator includes at least one BPSK modulator, wherein the at least one DLI provides a $\pi/2$ phase shift between arms of the DLI, and wherein the $n^m$QAM signal is a QPSK signal.

5. An optical transmitter comprising:

at least one nQAM modulator configured to modulate an optical carrier at a channel wavelength with a binary data stream using nQAM modulation to provide at least one nQAM signal, where n is an integer greater than one (1); and at least one delay line interferometer (DLI) configured to generate at least one $n^m$QAM signal from the nQAM signal, where m is an integer greater than one (1), wherein the DLI includes at least first and second arms and a time delay on at least one of the at least first and second arms, wherein the DLI is configured to split the at least one nQAM signal into at least first and second nQAM signals on the at least first and second arms, respectively, and wherein the time delay is configured to provide a one symbol shift such that at least one of the at least first and second nQAM signals is shifted by one symbol relative to another of the at least first and second nQAM signals.

6. The optical transmitter of claim 5 further comprising:
an RZ modulator configured to modulate the $n^m$QAM signal to generate an RZ $n^m$QAM signal with redundant symbols removed.

* * * * *